(12) United States Patent
Goldstein

(10) Patent No.: US 6,885,818 B2
(45) Date of Patent: Apr. 26, 2005

(54) SYSTEM AND METHOD FOR CONTROLLING ELECTRONIC DEVICES

(75) Inventor: Tim Goldstein, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 61 days.

(21) Appl. No.: 09/918,211

(22) Filed: Jul. 30, 2001

(65) Prior Publication Data
US 2003/0021601 A1 Jan. 30, 2003

(51) Int. Cl.[7] .......................... G03B 17/38; G02C 7/04; H04B 1/034
(52) U.S. Cl. ................... 396/59; 396/263; 396/429; 351/160 R; 455/100
(58) Field of Search ............... 396/56, 59, 263, 396/266, 429; 348/61; 600/558; 351/160 R; 455/100

(56) References Cited

U.S. PATENT DOCUMENTS

| | | | |
|---|---|---|---|
| 3,507,988 A | | 4/1970 | Holmes |
| 3,958,560 A | * | 5/1976 | March .................. 600/319 |
| 4,513,317 A | | 4/1985 | Ruoff, Jr. |
| 5,447,166 A | | 9/1995 | Gevins |
| 5,570,151 A | * | 10/1996 | Terunuma et al. ...... 396/263 X |
| 5,610,678 A | | 3/1997 | Tsuboi et al. |
| 5,734,421 A | | 3/1998 | Maguire, Jr. |
| 5,956,122 A | | 9/1999 | Doster .................. 351/210 |
| 6,190,314 B1 | | 2/2001 | Ark et al. .............. 600/300 |
| 6,312,393 B1 | * | 11/2001 | Abreu .................. 600/558 |
| 6,549,231 B1 | | 4/2003 | Matsui |

FOREIGN PATENT DOCUMENTS

JP 2001036800 2/2001

OTHER PUBLICATIONS

Examination Report. Ser. No. GB 0216119.8. European Patent Office, May 17, 2004.
U.S. Appl. No. 10/654,664, entitled, "System and Method for Controlling Electronic Devices," filed Sep. 4, 2003.

* cited by examiner

Primary Examiner—W. B. Perkey

(57) ABSTRACT

A system of the present invention automatically controls electronic devices based on physiological conditions of a user. In this regard, the system includes a sensor and a controller. The sensor is positioned adjacent to an eye of a user and is configured to detect a physiological response of the user. The sensor is configured to transmit, in response to a detection of the physiological response, a signal indicative of the response. The controller is configured to receive the signal and to control an electronic device based on the signal.

34 Claims, 8 Drawing Sheets

SYSTEM AND METHOD FOR CONTROLLING ELECTRONIC DEVICES

BACKGROUND OF THE INVENTION

1. Field of the Invention

The present invention generally relates to data processing techniques and, in particular, to a system and method for sensing physiological conditions and for automatically controlling electronic devices based on the sensed physiological conditions.

2. Related Art

Various electronic devices enable users to provide voluntary inputs for controlling many of the features of the electronic devices. For example, a camera normally includes a button or other type of switch that, when activated by a user, causes the camera to take a picture or to begin recording a scene. Thus, when the user sees a scene that he or she would like to capture with the camera, the user ensures that the camera is pointed at the scene of interest and then activates the foregoing button. In response, the camera takes a picture of or records the scene exposed to the lens of the camera.

Unfortunately, a finite amount of time exists for a user to provide a voluntary input to an electronic device. For example, a user may see a scene that the user would like to capture with a camera. However, by the time the user activates the input button to take a picture of the scene or to begin recording the scene, the scene may change. As a result, the user may fail to capture the desired image with the camera.

SUMMARY OF THE INVENTION

Thus, a heretofore unaddressed need exists in the industry for an efficient system and method of quickly providing inputs to or controlling various electronic devices, such as for example, electronic cameras. Generally, the present invention provides a system and method for sensing physiological conditions and for automatically controlling electronic devices based on the sensed physiological conditions.

In architecture, the system of present invention utilizes a sensor and a controller. The sensor is positioned adjacent to an eye of a user and is configured to detect a physiological response of the user. The sensor is configured to transmit, in response to a detection of the physiological response, a signal indicative of the response. The controller is configured to receive the signal and to control an electronic device based on the signal.

The present invention can also be viewed as providing a method for controlling electronic devices based on physiological conditions. The method can be broadly conceptualized by the following steps: positioning a sensor adjacent to an eye of a user; detecting, via the sensor, an occurrence of a physiological condition of the user; and automatically controlling an electronic device based on the detecting step.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

In general, the present invention provides a system and method of automatically providing control signals to an electronic device based on a sensed physiological condition or response. Thus, control signals can be quickly and efficiently provided to the electronic device. Further, when the sensed physiological condition is involuntary, the user's burden of providing inputs to the electronic device can be significantly reduced.

Figure 1:
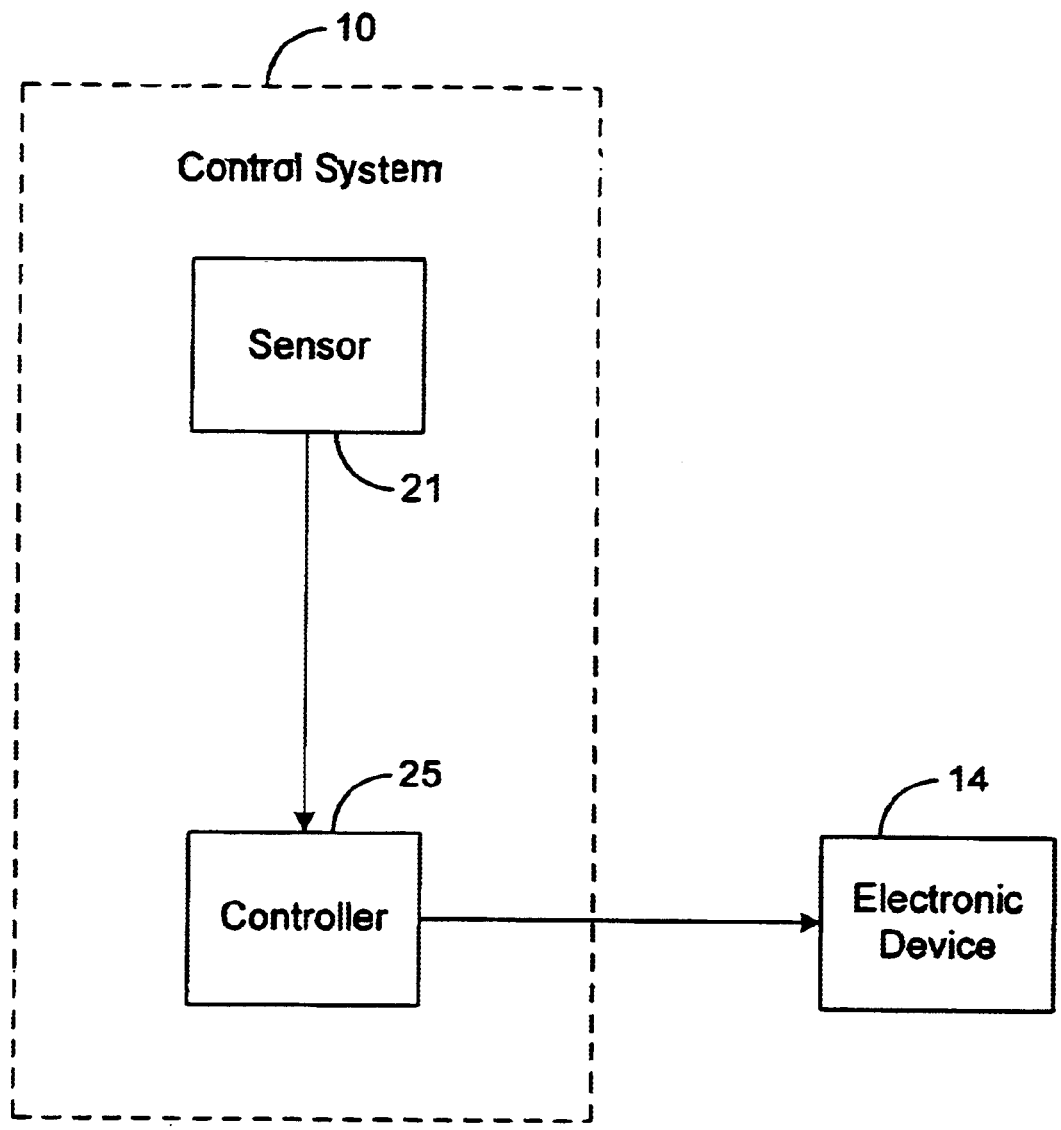
FIG. 1 is a block diagram illustrating a control system in accordance with the present invention.

FIG. 1 depicts an exemplary control system 10 capable of providing inputs or control signals to an electronic device 14. As used herein, "an electronic device" is any device that is at least partially controlled via electrical signals. For illustrative purposes, the electronic device 14 will be described herein as a camera capable of capturing an image of a scene. However, it should be noted that the electronic device 14 should not be so limited, and it is possible for the electronic device 14 to be implemented as other types of products for performing various other functionality.

Moreover, there are various methodologies that may be employed to "capture" an image of a scene. For example, photosensitive material (film) can be exposed to light from the scene, thereby forming an image of the scene on the photographic material. Alternatively, light from the scene may be converted into digital data that defines an image of the scene, and this digital data may be stored in memory and/or used to render the image of the scene. The electronic device 14 can be designed as a still frame camera (i.e., a camera that captures images one at a time) or can be designed as a video camera (i.e., a camera that, when activated, continuously captures the images exposed to the camera's lens in order to define a moving image).

Note that a video camera can also be used to capture still frame images at selected times. For example, in response to a user input, a video camera may be designed to store, as a still frame picture, the image currently being viewed by the camera's lens. In another embodiment, the video camera, in response to a user input, may be configured to watermark a particular frame of a moving image that is being recorded by the video camera. At a later time, the watermarked frame may be rendered as a still image upon request. There may be various other methodologies that may be employed to capture still or moving images.

As shown by FIG. 1, the control system 10 includes a sensor 21 electrically coupled to a controller 25. The sensor 21 is capable of detecting one or more physiological conditions and is configured to transmit, to the controller 25, information pertaining to the conditions detected by the sensor 21. The sensor 21 may be connected to the controller 25 via one or more conductive buses or wires. Alternatively, the sensor 21 may be physically separated from the controller 21 and wirelessly communicates physiological condition information to the controller 25. If the sensor 21 communicates information wirelessly, then the sensor 25 may include a wireless interface, such as an antenna, for example, for communicating with the controller 25.

The controller 25 is preferably capable of communicating with the electronic device 14. The controller 25 may be connected to the electronic device 14 via one or more conductive buses or wires. Alternatively, the controller 25 may be physically separated from the electronic device 14 and may wirelessly communicate with the electronic device 14. If the controller 25 wirelessly communicates information, the controller 25 may include a wireless interface, such as an antenna, for example, for communicating information with the electronic device 14. Note that is it possible for the controller 25 to be located within or fixedly attached to mechanical components, such as a housing, of the electronic device 14.

Figure 2:
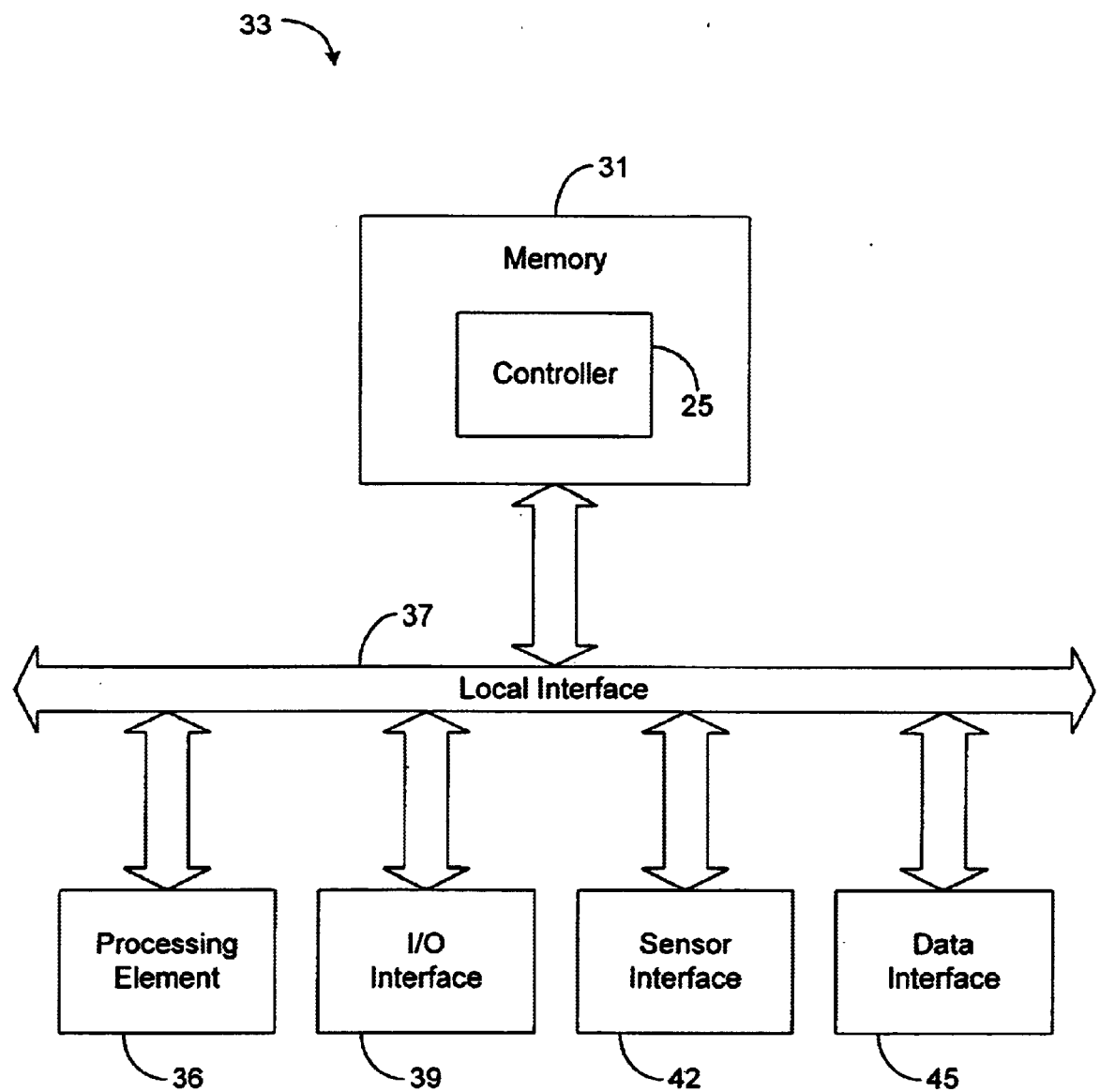
FIG. 2 is a block diagram illustrating a computer system employing a controller such as is depicted in FIG. 1.

Note that the controller 25 can be implemented in software, hardware, or a combination thereof In one embodiment, as illustrated by way of example in FIG. 2, the controller 25 along with its associated methodology is implemented in software and stored in memory 31 of a computer system 33.

The computer system 33 of FIG. 2 comprises one or more conventional processing elements 36, such as a digital signal processor (DSP) or a central processing unit (CPU), that communicate to and drive the other elements within the system 33 via a local interface 37, which can include one or more buses. Furthermore, an input/output (I/O) interface 39 may be used to communicate data with the system 33 and, in particular, with the controller 25. The I/O interface 39 may include devices that enable data to be input from or output to a user. Such devices may include, for example, buttons or other types of switches for inputting information to the system 33 and a liquid crystal display (LCD) or other type of display device for outputting information from the system 33. The system 33 of FIG. 2 also comprises a sensor interface 42 and a data interface 45 for respectively communicating with sensor 21 and device 14 (not shown in FIG. 2).

The controller 25 is configured to receive the physiological condition information transmitted from the sensor 21 and to determine whether any control signals should be provided to the electronic device 14 based on this information. For example, when the electronic device 14 is a camera, the controller 25 may determine, based on the information provided by the sensor 21, that the device 14 should capture an image of a scene. In response, the controller 25 may transmit, to the electronic device 14, a control signal instructing the device 14 to capture an image. Thus, the device 14 is automatically instructed by the control system 10 to capture an image of a scene in response to one or more physiological conditions detected by the sensor 21.

There are various types of physiological conditions that may be monitored by the control system 10 for the purpose of controlling the device 14. For example, it may be desirable for the excitement level of a user to serve as a triggering event for controlling the electronic device 14. In this regard, a user of a camera often exhibits signs of excitement when the user sees an image of a scene that he or she would like to capture with a camera. Thus, the sensor 21 may be configured to detect one or more physiological conditions or responses, within the user's body, that indicate whether a user is excited. Based on such detections by the sensor 21, the controller 25 may determine that the excitement level of the user has increased and, in response, instruct the electrical device 14 to capture an image. Thus, the system 10 causes the electronic device 14 to capture an image of a scene based on the user's excitement level.

Various physiological responses occur within a user's body when a user becomes excited. For example, when a user becomes excited, the user may emit detectable amounts of perspiration or pheromones, or the user may blink his or her eyes more rapidly. In addition, the user's body or skin temperature and galvanic skin response usually change with a change in excitement level, and brain wave activity normally increases with an increase in excitement. Also, when a user sees an interesting object that excites the user, the user often flexes his or her eyeball in order to focus his or her vision on the object, and as the user becomes more excited, his or her eye pupil normally becomes more dilated. The sensor 21 is configured to monitor one or more of the foregoing physiological responses in order to provide the controller 25 with sufficient information for determining how to control the electronic device 14. There are various other physiological responses that occur in the user's body when the user becomes excited and that may be monitored by the control system 10 for controlling the electronic device 14.

Note that there presently exist many types of conventional sensors for monitoring galvanic skin response, brain wave activity, body or skin temperature, heart rate, blood oxygen levels, perspiration, and pheromones, and these conventional sensors may be employed in implementing the present invention. During operation, many of these conventional sensors for monitoring one or more of the foregoing involuntary physiological responses are preferably attached to the user being monitored. Thus, to provide the user with better movement flexibility during operation, it may be desirable to have the sensor 21 physically separated from the controller 25 and/or the electronic device 14. In such an embodiment, communication can be maintained with the controller 25 and/or the device 14 via wireless signals.

There are various techniques that may be employed to determine when the user is blinking his or her eyes. In one embodiment, a small switch (e.g., a micro-switch or a nano-switch) may be positioned within close proximity of the user's eyelid. The switch may be activated when the user blinks such that each blink of the user's eyelid can be detected by the switch. Such a switch is shown in FIGS. 3 and 4 and is designated by reference numeral 52.

Figure 3:
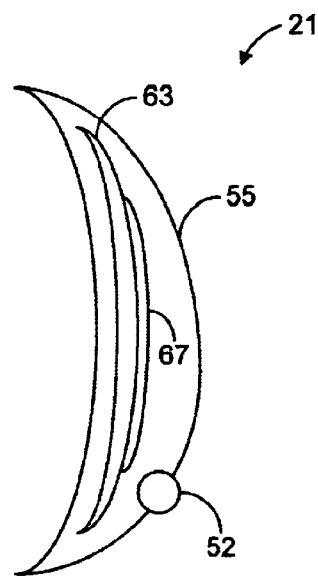
FIG. 3 is a diagram illustrating a side view of a sensor depicted in FIG. 1, when the sensor is implemented via a contact lens.
Figure 4:
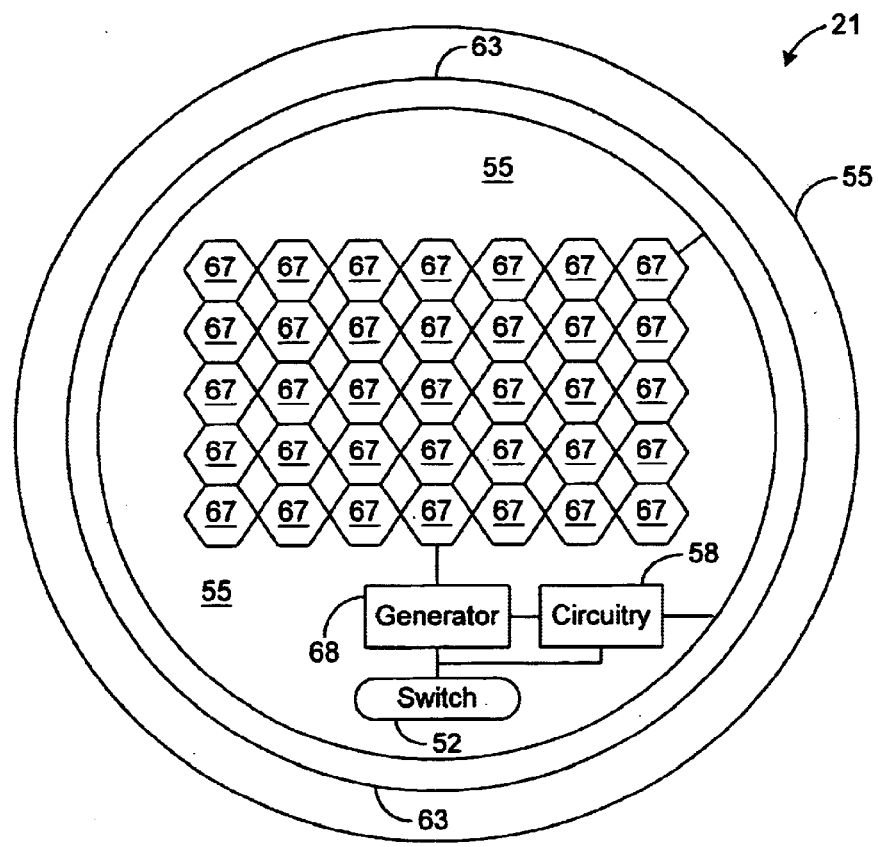
FIG. 4 is a diagram illustrating a front view of the contact lens depicted in FIG. 3.

In the embodiment shown by FIGS. 3 and 4, the switch 52 is coupled to a contact lens 55 that, similar to conventional contact lenses, may be worn on one of the user's eyeballs. In FIGS. 3 and 4, the switch 52 is a friction roller, although other types of devices may be used to implement the switch 52 in other embodiments. When the user blinks, the user's eyelid passes over the surface of contact lens 55 and eventually over the switch 52. Friction between the user's eyelid and the switch 52 causes the switch 52 to move or, more specifically, to rotate. When the user's eyelid is opened, friction between the user's eyelid and the switch 52 causes the switch 52 to move in an opposite direction, thereby returning the switch to its original position or state.

The movement of the switch 52 is detected by circuitry 58, which senses an activation of the switch 52 when the switch 52 is moved by a user blink, as described above. When the circuitry 58 detects activation of the switch 52, the circuitry 58 transmits a signal to notify controller 25 of the activation. If the controller 25 is physically separated from the circuitry 58, then the circuitry 58 wirelessly transmits the signal to the controller 25, via an antenna 63. The controller 25 can monitor the frequency of the blinks detected by the circuitry 58 in order to determine whether the excitement level of the user has increased or decreased. The controller 25 may then transmit a control signal to electronic device 14 based on the user's change in excitement level. For example, if the controller 25 determines that the frequency of the user's blinks has increased, the controller 25 may determine that the user's excitement level has increased and that the device 14 should, therefore, capture an image. In response, the controller 25 may transmit a control signal to device 14 to instruct the device 14 to capture an image.

Note that, in capturing an image, is it possible for the device 14 to take a picture of or record the image based on light detected from one or more photodetectors 67 residing on or within contact lens 55. In such an embodiment, one or more photodetectors 67 may transmit image information to the device 14 via antenna 63, and based on this information, the device 14 may store an image of the scene exposed to the photodetectors 67. In this regard, the photodetectors 67 located on or within the contact lens 55 detect an image, and data defining this image is transmitted to and stored in the device 14, which may be located remotely from the lens 55. Since the contact lens 55 resides on the user's eyeball, the photodetectors 67 should receive the same image viewed by the user. Therefore, when the device 14 stores image data transmitted from the photodetectors 67, the device 14 should be capturing the same image seen by the user.

Utilizing information from the sensor 21 to make control decisions may be particularly advantageous in the foregoing embodiment where photodetectors 67 reside within a contact lens 55 or in an embodiment where the photodetectors 67 reside in eyeglasses or another type of head-mounted apparatus. In this regard, as described above, the photodetectors 67 in such embodiments can be automatically exposed to the scene that is seen by the user. Therefore, when the controller 25 detects that the user has become excited, it is likely that the scene being viewed by the user excited the user. Thus, it is likely that the user intended to take a picture of the scene or image that is captured by the device 14 in response to an increase in the user's excitement level. Assuming that the foregoing is true, the capturing of the scene by the device 14 should occur very soon after the user is excited, if the device 14 is automatically controlled based on detections by the sensor 21, as described above. Indeed, the capturing of the scene should occur much sooner than in an embodiment where the user is required to point a conventional camera toward the scene of interest and manually activate the camera. Therefore, by utilizing the techniques of the present invention, it is less likely that the scene has changed before the device 14 captures an image of the scene.

It should be noted that each of the components of lens 55 shown in FIGS. 3 and 4 should be of a sufficiently small size (e.g., nano-sized or micro-sized) such that the user's vision is not significantly affected by the presence of the components in the lens 55. Also note that a generator 68 may be necessary to provide the components of the lens 55 with sufficient power. The generator 68 is further described in U.S. Patent Application entitled "System and Method for Providing Power to Electrical Devices," filed concurrently herewith, which is incorporated herein by reference.

Figure 5:
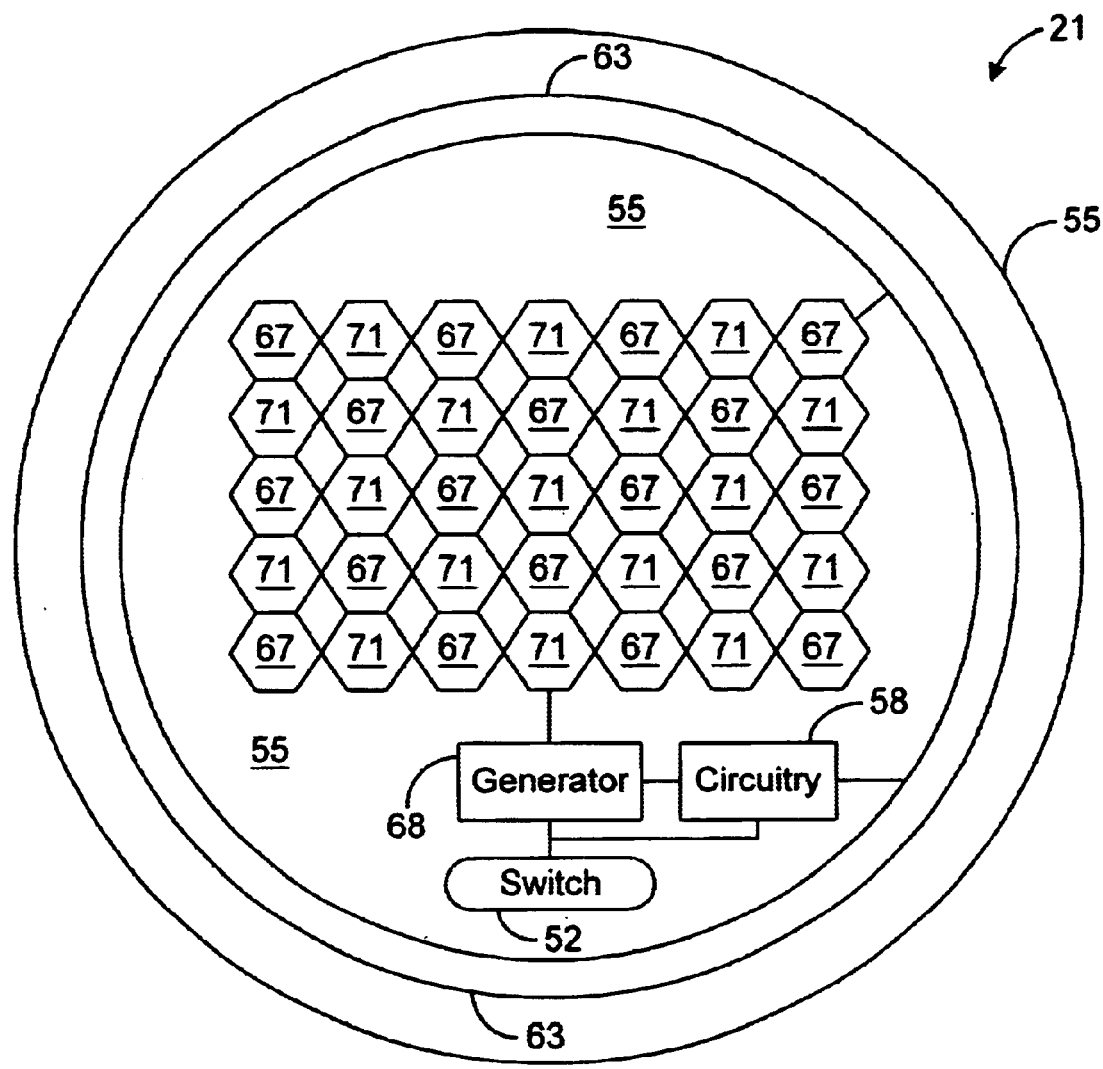
FIG. 5 is a diagram illustrating photoemitters and photodetectors residing within the contact lens depicted in FIG. 4.

As shown by FIG. 5, the lens 55 may include photoemitters 71 configured to emit light toward a user's eye when the user is wearing the lens 55 on his or her eyeball. This light should reflect off of the user's eye, and at least some of the photodetectors 67 may be configured to receive or detect the reflected light. Data defining this reflected light may then be transmitted to controller 25, which processes this data to determine how to control the electronic device 14. For example, the controller 25 may analyze the foregoing data to determine when and/or how often the user is blinking. Alternatively, the controller 25 may analyze the foregoing data to determine whether or not the user's pupil has become more dilated. As previously described, the frequency of blinking and the amount of pupil dilation may indicate that the user has become excited, and the controller 25 may utilize this information to control the device 14 in a particular manner.

Figure 6:
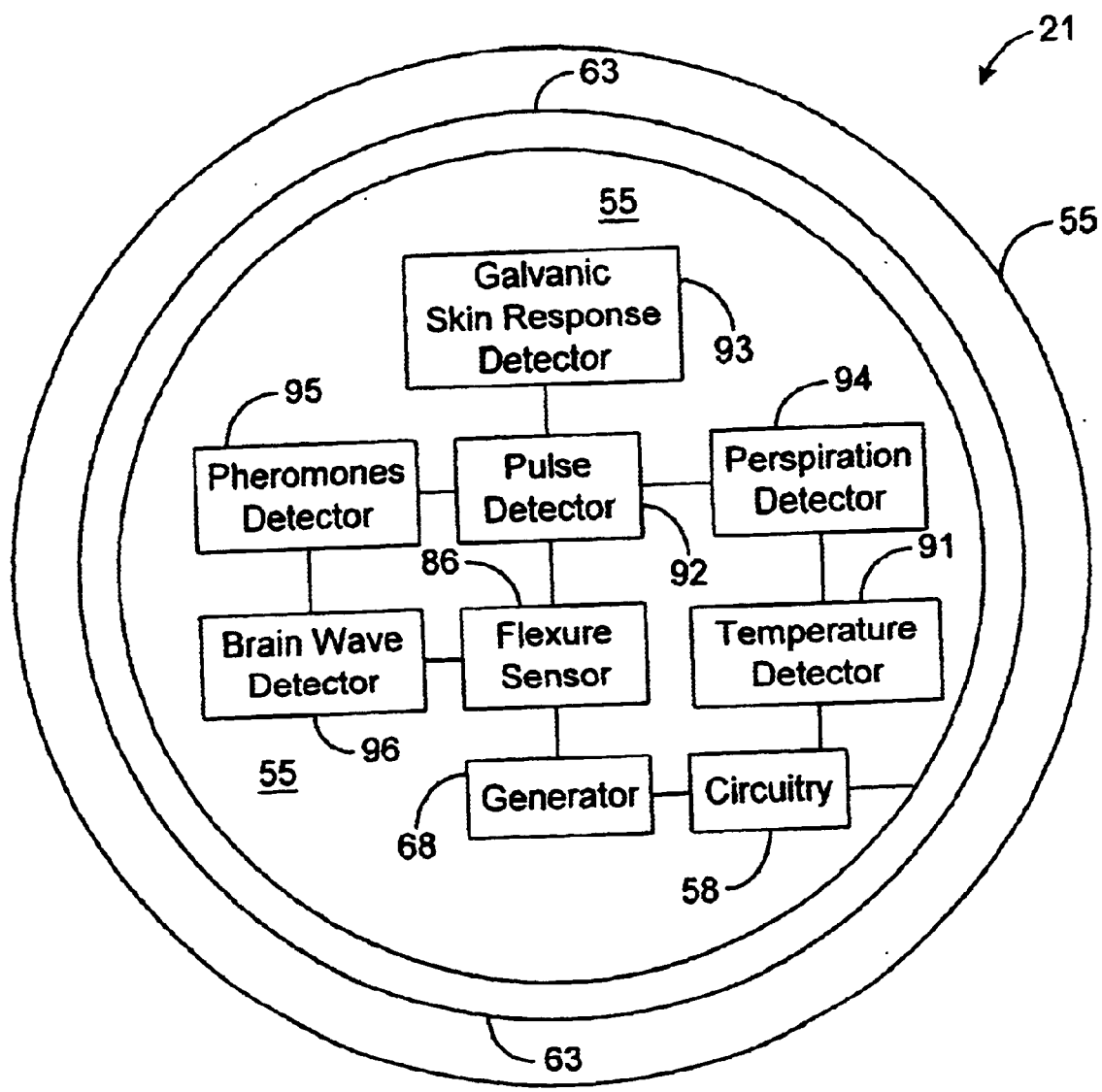
FIG. 6 is a block diagram illustrating various detection devices residing within the contact lens of FIG. 5.

As shown by FIG. 6, the lens 55 may include a flexure sensor 86 configured to detect when the lens 55 deforms and, therefore, when the user flexes his or her eyeball. A user normally flexes his or her eyeball in order to focus on an object of interest. Thus, the controller 25 may utilize the information provided by the flexure sensor 86 in order to help determine whether the user is seeing a scene that is exciting to the user, and the controller 25 may, therefore, utilize this information in order to control the device 14.

Various other biometric sensors may be included in the lens 55. For example, the lens 55 may include a temperature detector 91 to detect the user's body temperature or a pulse detector 92 to detect the user's pulse. In addition, the lens 55 may include a galvanic skin response detector 93, a perspiration detector 94, a pheromones detector 95, and/or a brain wave detector 96. Information from one or more of these detectors 91–96 may be transmitted to and utilized by the controller 25 to detect the excitement level of the user and, therefore, to control the device 14.

Note that it is not necessary for the components of FIGS. 2–6 to reside within or on a lens 55. In this regard, the components of FIGS. 2–6 may reside within or on any device that is positioned within close proximity of the user's eye. For example, the components may reside within or on eyeglasses being worn by the user. In another example, the components may reside within or on an eyepiece (i.e., a component that is held close to the user's eye during operation) of the device 14, particularly when the device 14 is implemented as a camera. In such embodiments, the photodetectors 67 and/or the photoemitters 71 may reside within or on a lens of a pair of eyeglasses or of an eyepiece. Furthermore, the switch 52 may be implemented as a lever that extends within the path of movement of the user's eyelid when the user blinks. Note that the term "eyelid," as used herein, refers to the user's eyelashes in addition to the user's skin that normally passes over the user's eye during a blink.

Figure 7:
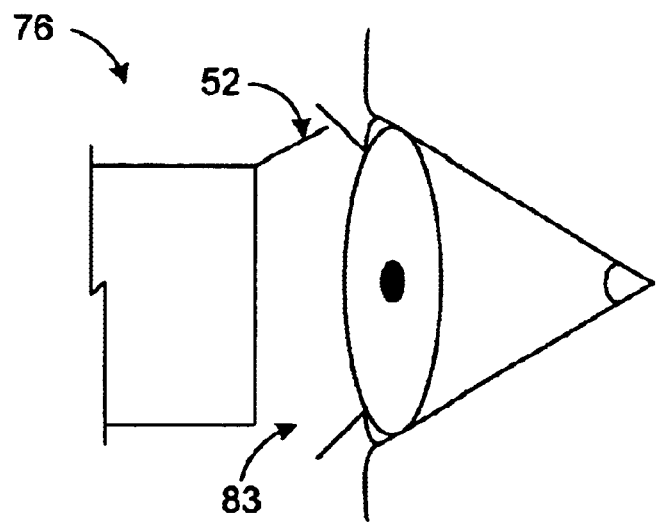
FIG. 7 is a diagram of an eyepiece of an electronic device depicted in FIG. 1, when the eyepiece is positioned close to a user's eye such that a switch coupled to the eyepiece is capable of detecting blinks of the user's eyelid.

FIG. 7 depicts a switch 52 positioned within a path of movement of a user's eyelid, as described above. The switch 52 of FIG. 7 is coupled to an eyepiece 76 that should be positioned just in front of the user's eye 83 when the user is looking through the eyepiece 76. The eyepiece 76 may be any component of the device 14 that is held close to the user's eye 83 during normal operation of the device 14. As an example, when the device 14 is implemented as a camera, the eyepiece 76 may be a portion of the camera's viewfinder that is typically held adjacent to the user's eye during normal operation of the camera. When the user blinks, the user's eyelid should engage and move the switch 52, thereby activating the switch 52. When the user opens his or her eye during a blink, the switch 52 should be configured to return to its original position so that the next blink by the user can be detected.

Figure 8:
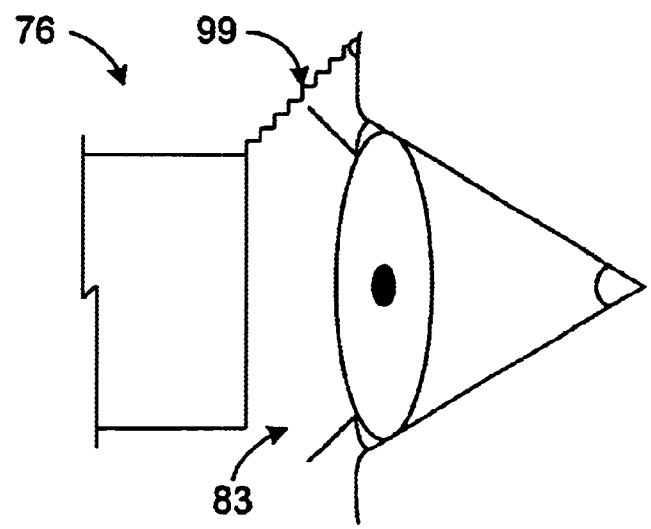
FIG. 8 is a diagram of an eyepiece of an electronic device depicted in FIG. 1, when a sensor is engaged with a user's face and is tethered to the eyepiece.

In addition, similar to the switch 52, any of the detectors 91–96 of FIG. 6 may be coupled to the eyepiece 76. It may be necessary to engage some of these detectors 91–96 with the user's face in order to enable the sensing of the physiological conditions of interest. For example, it may be necessary or desirable to engage the temperature detector 91 or the galvanic skin response detector 93 with the user's face or other body location so that the detector 91 or 93 can take an accurate reading. As an example, if an eyepiece of the device 14 is designed to engage a user's face during normal operation of the device 14, then a sensor, such as detector 91 or 93, for example, may reside on a portion of the eyepiece such that the detector 91 or 93 engages the user's face when the eyepiece is correctly positioned during normal operation. In another example, a sensor, such as detector 91 or 93 for example, may be attached to the user's face and tethered to the eyepiece 76 via a flexible tether 99, as shown by FIG. 8. Other types of detectors may be similarly engaged with the user in other embodiments.

Moreover, it may not be necessary to engage one or more of the detectors 91–96 with the user. For example, the eyepiece 76 may be designed to fit close to the user's eye, and the perspiration detector 94 may be coupled to the eyepiece 76 such that the detector 94 resides between the eyepiece 76 and the user's eye 83. If the user becomes excited and emits more perspiration, the air between the user's eye and the eyepiece 76 should become more humid, and the perspiration detector 94 may be configured to measure the humidity of this air without engaging the user. If the humidity of this air increases, the controller 25 may determine that the user has become more excited and may, therefore, control the device 14 accordingly.

Figure 9:
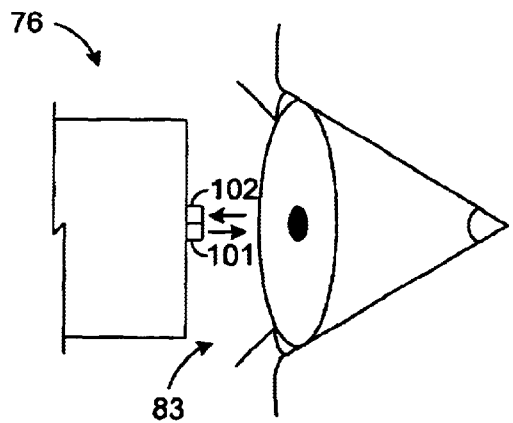
FIG. 9 is a diagram of an eyepiece of an electronic device depicted in FIG. 1, when the eyepiece includes a laser or other type of photoemitter for detecting blinks of a user's eyelid or the size of the user's eye pupil.

In another example, which is depicted by FIG. 9, the eyepiece 76 may include a laser or photoemitter 101 that emits light toward the user's eye 83, similar to the photoemitters 71 of FIG. 5. Photodetectors 102, similar to the photodetectors 67 of FIG. 5, residing on the eyepiece 76 may then detect the light reflected from the user's eye 83 in order to enable determination of the rate of eyelid blinking or the amount of pupil dilation. As described hereinabove, such information may be utilized by the controller 25 to determine how the electronic device 14 should be controlled. Note that other types of detectors may be coupled to the eyepiece 76 in other embodiments.

It should be further noted that the physiological conditions described hereinabove have generally been involuntary responses that are based on a user's excitement level. However, it is possible for the controller 25 to base its operation on other types of detected conditions. For example, the user could voluntarily blink his eyes according to a particular pattern or algorithm in order to convey a desire to control the device 14 in a particular manner.

For illustrative purposes, assume that the circuitry 58 is capable of detecting whether a blink is a long blink (i.e., a blink where the user's eyes stays shut for a specified time period) or a short blink (i.e., a blink where the user's eyes stays shut less than a specified time period). Also assume that the controller 25 is configured to transmit a particular control signal (e.g., a control signal instructing the device 14 to capture an image) in response to detections by the sensor 21 that the user, within a specified time period, has performed a short blink followed by a long blink. In this embodiment, the user can intentionally cause the device 14 to capture an image by performing a short blink followed by a long blink. When this occurs, the sensor 21 communicates information to the controller 25 indicating the occurrence of the two blinks, and in response, the controller 25 transmits a control signal to device 14 causing the device 14 to capture an image. Thus, as shown by the foregoing example, the controller 25 can be configured to control the device 14 based on voluntary inputs detected by the sensor 21. Note that other blinking patterns for controlling the device 14 are possible without departing from the principles of the present invention.

It should also be noted that there are various methodologies that may be employed for the controller 25 to determine how the device 14 is to be controlled based on the information provided by the sensor 21. In this regard, the controller 25 may analyze whether a plurality of the aforementioned physiological responses occurred within a specified time period to determine whether the user has become excited such that a particular control signal should be transmitted to device 14. In such an embodiment, the occurrence of any one of the physiological responses (e.g, an increase in the frequency of blinks, an increase in body temperature, etc.) is a factor in the overall decision as to the status of the user's excitement level and, therefore, as to whether a particular control signal should be transmitted by controller 25.

In addition, in the embodiment shown by FIGS. 1 and 2, the controller 25 is shown as being separate from the device 14 yet capable of communicating with the device 14 via data interface 45. In such an embodiment, the controller 25 may reside at any convenient location, including within lens 55. For example, the controller 25 and the other components of the system 33 may be housed by housing unit (not shown), and this housing unit may be attached to the user (e.g., attached to the user's belt or other convenient location). Attaching such a housing unit to the user should preferably keep the controller 25 and sensor 21 within close proximity. This may be advantageous in order to keep the connections between sensor 21 short, in embodiments where the sensor 21 is tethered to the controller 25, or to keep the sensor interface 42 (e.g., an antenna) within range of antenna 63, in embodiments where the sensor 21 wirelessly communicates.

Figure 10:
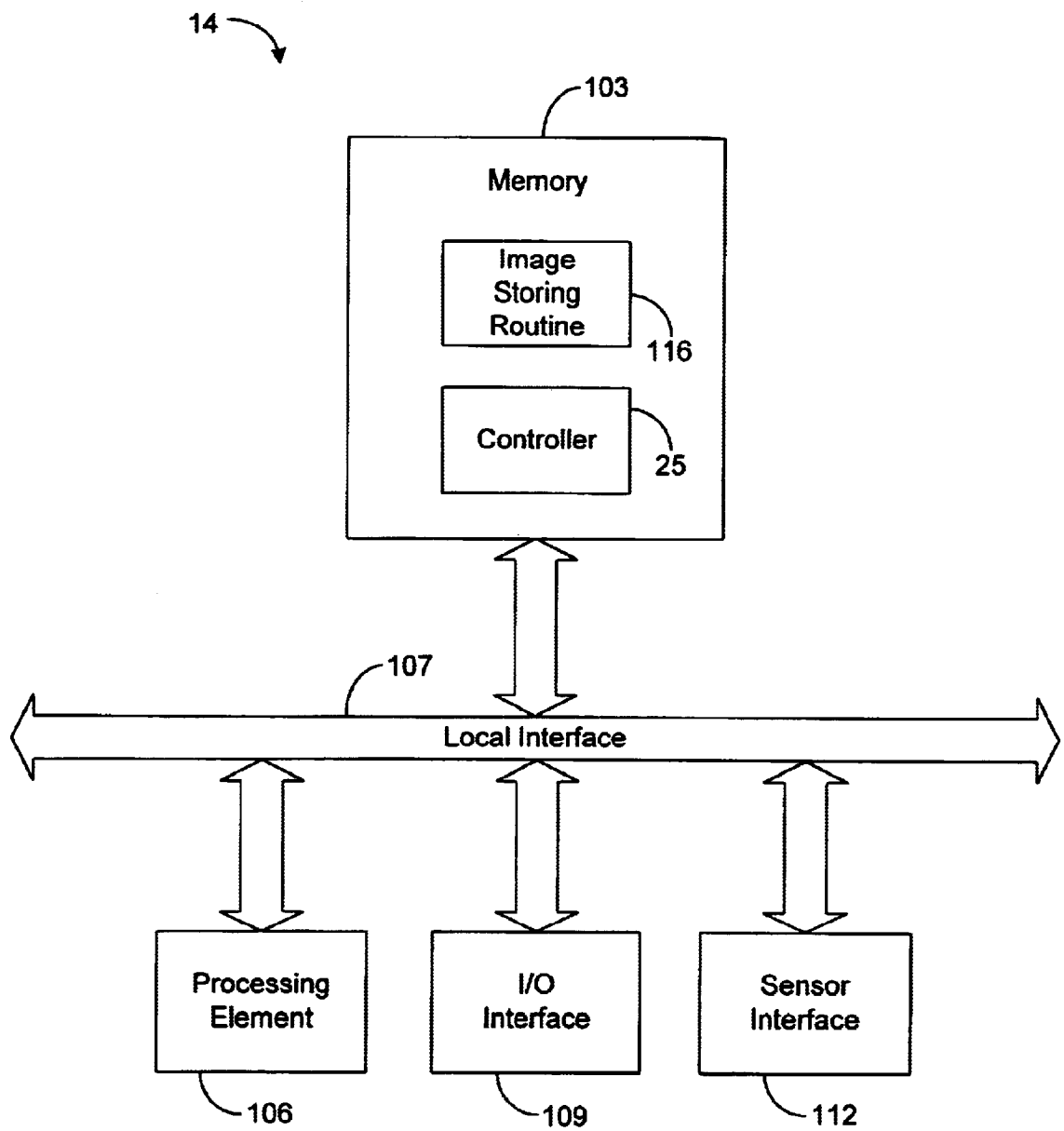
FIG. 10 is a block diagram illustrating a more detailed view of an electronic device depicted in FIG. 1.

Furthermore, as previously set forth, it is possible to include the controller 25 within the device 14. An exemplary embodiment showing the controller 25 residing within device 14 is shown by FIG. 10. In this embodiment, similar to the embodiment shown by FIG. 2, the controller 25 is implemented in software and stored within memory 103. In addition, one or more conventional processing elements 106, such as a digital signal processor (DSP) or a central processing unit (CPU), communicate to and drive the other elements within the device 14 via a local interface 107, which can include one or more buses. In particular, the processing element 106 is configured to execute the instructions of any software, including controller 25, stored in memory 103. Furthermore, an input/output (I/O) interface 109 may be used to communicate data. In this regard, the I/O interface 109 may include devices that enable data to be input from or output to a user. Such devices may include, for example, buttons or other types of switches for inputting information to the device 14 and a liquid crystal display (LCD) or other type of display device for outputting information from the device 14 (not specifically shown in FIG. 10). The device 14 of FIG. 10 also comprises a sensor interface 112 for communicating with the sensor 21.

As previously described, the controller 25 is configured to control the device 14 based on physiological conditions sensed by sensor 21. For example, if the device 14 is a camera as described hereinabove, the controller 25 may cause the device 14 to take a picture or to begin recording in response to information transmitted from sensor 21. In this regard, the controller 25 may transmit a signal that induces invocation of an image storing routine 116 that is configured to cause the device 14 to begin storing image data in memory 103. This image data may be provided by a photodetector (not shown) within device 14 or may be provided from one or more of the photodectors 67 of FIG. 4. In any event, the operation of the controller 25 in the embodiment shown by FIG. 10 is similar to the operation of the controller 25 in the embodiment shown by FIG. 2.

OPERATION

The preferred use and operation of the control system 10 and associated methodology are described hereafter.

To illustrate the present invention, assume that the electronic device 14 is a video camera. Further assume that the control system 10 is configured to control when the device 14 begins to record a scene based on the excitement level of a user, as described above. In this regard, assume that the control system 10 is configured to transmit a control signal for activating the device 14 when the control system 10 determines that the user's bodily temperature has increased to a predetermined threshold level and that the user is blinking rapidly (i.e., the user blinks at least a predetermined number of times within a specified time period). Further assume that the sensor 21 includes a temperature detector 91 for detecting the user's body temperature and the switch 52 shown by FIG. 4 for detecting the frequency of the user's blinks.

It should be noted that the detection of the foregoing physiological conditions for activating a video camera is presented for illustrative purposes only. In this regard, the control system 10 may be utilized to provide other types of control signals to other types of products in other embodiments. Furthermore, in controlling the device 14, the control system 10 may detect and base its decisions on other types of physiological conditions, if desired.

Figure 11:
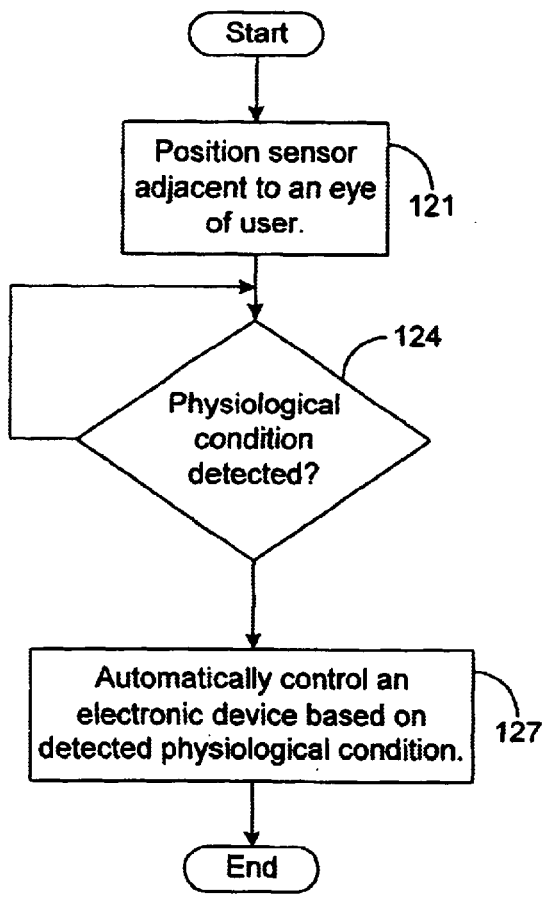
FIG. 11 is a flow chart illustrating an exemplary methodology for controlling an electronic device in accordance with the present invention.

In block 121 of FIG. 11, the switch 52 is positioned adjacent to the user's eye such that it is activated when the user blinks, and the temperature detector 91 is positioned such that it can detect the user's body temperature. During operation, the sensor 21 continuously, periodically, or upon request transmits, to the controller 25, information pertaining to the physiological conditions being monitored. In the present example, the temperature detector 91 detects the user's bodily temperature and transmits information indicative of the user's temperature to the controller 25. In addition, the circuitry 58 of FIG. 4 detects each time the user blinks and, therefore, activates switch 52. The circuitry 58 then transmits, via antenna 63, information indicative of the user's blinking frequency. For example, in one embodiment, the circuitry 58 immediately transmits a signal of a particular logic level when the circuitry 58 detects a blink. The controller 25 then counts the number of signals having the particular logic level received from the antenna 63 within a specified time period in order to determine the user's blinking frequency.

When the controller 25 detects that the user's temperature has exceeded a predetermined threshold and that the user's blinking frequency has simultaneously increased above another predetermined threshold, the controller 25 determines that the device 14 should be activated in block 124. In response, the controller 25 transmits, in block 127, a control signal to the device 14 causing the device 14 to begin recording. Thus, at this point, the control system 10 has converted involuntary physiological responses by the user into a control signal for controlling the electronic device 14 in a desired manner. Note that, as previously described, the system 10 may control the electronic device 14 in other ways and/or based on other types of physiological responses or conditions.

Now, therefore, the following is claimed:

1. A system for controlling electronic devices based on physiological responses, comprising:
   a plurality of sensors positioned adjacent to an eye of a user, said sensors configured to detect a plurality of different involuntary physiological responses of said user and to transmit, in response to detections of said physiological responses by said sensors, signals indicative of said physiological responses; and
   a controller configured to receive said signals and to trigger an electronic device to perform a particular task based on whether each of said plurality of detected physiological responses occurs during a particular time period.

2. A system for controlling electronic devices based on physiological responses, comprising:
   a plurality of sensors positioned adjacent to an eye of a user, said sensors configured to detect a plurality of different involuntary physiological responses of said user and to transmit, in response to detections of said physiological responses by said sensors, signals indicative of said physiological responses, each of said signals indicative of a different one of said physiological responses; and
   a controller configured to receive said signals and to determine a value indicative of an excitement level of said user based on each of said signals, said controller further configured to control an electronic device based on said value.

3. The system of claim 1, wherein one of said physiological responses is a blink of an eyelid of said user.

4. The system of claim 1, wherein said physiological responses are indicative of an excitement level of said user.

5. The system of claim 1, further comprising a contact lens coupled to one of said sensors.

6. The system of claim 1, wherein said electronic device is a camera.

7. The system of claim 5, further comprising an antenna coupled to said contact lens.

8. The system of claim 7, wherein said one sensor is configured to transmit one of said signals to said controller via said antenna.

9. A system for controlling electronic devices based on physiological responses, comprising:
   a sensor positioned adjacent to an eye of a user, said sensor configured to detect a physiological response of said user and to transmit, in response to a detection of said physiological response, a signal indicative of said physiological response; and
   a controller configured to receive said signal and to control an electronic device based on said signal,
   wherein said sensor comprises a switch that is positioned within a path of movement of an eyelid of said user, said switch activated when said user blinks said eyelid.

10. The system of claim 9, wherein said switch is coupled to said electronic device.

11. A system for controlling electronic devices based on physiological responses, comprising:
   a contact lens;
   a plurality of sensors coupled to said contact lens, said sensors configured to detect a plurality of different involuntary physiological responses of a user and to transmit, in response to detections of said physiological responses, signals indicative of said physiological responses; and
   a controller configured to receive said signals and to trigger an electronic device to perform a particular task based on whether each of said plurality of detected physiological responses occurs during a specified time period.

12. A system for controlling cameras based on physiological responses, comprising:
   a contact lens;
   a sensor coupled to said contact lens, said sensor configured to detect a physiological response of a user and to transmit, in response to a detection of said physiological response, a signal indicative of said physiological response; and
   a controller configured to receive said signal and to control a camera based on said signal.

13. A system for controlling electronic devices based on physiological responses, comprising:
   a contact lens;
   a sensor coupled to said contact lens, said sensor configured to detect a physiological response of a user and to transmit, in response to a detection of said physiological response, a signal indicative of said physiological response; and
   a controller configured to receive said signal and to control an electronic device based on said signal,
   wherein said sensor comprises a switch that is positioned within a path of movement of an eyelid of said user, said switch activated when said user blinks said eyelid.

14. A method for controlling electronic devices based on physiological responses, comprising:
   positioning a plurality of sensors adjacent to an eye of a user;
   detecting, via said sensors, a plurality of different involuntary physiological responses of said user;
   determining whether each of said different involuntary physiological responses is detected, via said detecting step, within a particular time period; and
   automatically triggering an electronic device to perform a particular task based on said determining.

15. A method for controlling cameras based on physiological responses, comprising:
   positioning a sensor adjacent to an eye of a user;
   detecting, via said sensor, a physiological response of said user; and
   automatically controlling a camera based on said detecting,
   wherein said sensor is coupled to a contact lens.

16. The method of claim 14, further comprising counting, via at least one of said sensors, a number of eye blinks performed by said user within a specified time period, wherein said controlling is based on said counting.

17. A method for controlling electronic devices based on physiological responses, comprising:
   positioning a plurality of sensors adjacent to an eye of a user;
   detecting, via said sensors, a plurality of different involuntary physiological responses of said user;
   determining a value indicative of an excitement level of said user based on each of said different involuntary responses detected via said detecting; and
   automatically controlling an electronic device based on said value determined in said determining.

18. The method of claim 14, wherein said electronic device is a camera.

19. A system, comprising:
   a camera;
   a sensor configured to detect a physiological response of a user;
   a contact lens coupled to said sensor; and
   a controller configured to cause said camera to capture an image based on a detection of said physiological responses by said sensor.

20. A method, comprising:
   providing a camera;
   detecting a physiological response of a user of said camera; and
   automatically causing said camera to capture an image based on said detecting,
   wherein said detecting is performed by a sensor coupled to a contact lens.

21. The system of claim 2, wherein said controller is configured to trigger said electronic device to perform a particular task based on a comparison of said value to a threshold.

22. The system of claim 9, wherein said switch is coupled to a contact lens and comprises a friction roller.

23. A system for controlling electronic devices, comprising:
   a contact lens;
   a photodetector coupled to said contact lens, said photodetector configured to detect light reflected off of an eye of a user and to transmit a signal indicative of said detected light; and
   a controller configured to receive said signal and to control an electronic device, based on an amount of pupil dilation indicated by said signal.

24. The system of claim 23, wherein said electronic device is a camera.

25. The system of claim 23, further comprising a photoemitter coupled to said contact lens, said photoemitter configured to emit said light toward said eye.

26. A system for controlling electronic devices, comprising;
   a contact lens;
   a photodetector coupled to said contact lens, said photodetector configured to detect a blink of an eye of a user and to transmit a signal indicative of said detected blink; and
   a controller configured to receive said signal and to control an electronic device based on said signal.

27. The system of claim 26, wherein said electronic device is a camera.

28. The system of claim 26, further comprising a photoemitter coupled to said contact lens, wherein said photodetector is configured to detect said blink based on said light emitted from said photoemitter.

29. A method for controlling electronic devices, comprising:

receiving light via a photodetector coupled to a contact lens;

detecting pupil dilation of a user wearing said contact lens based on said light; and automatically controlling an electronic device based on said detecting.

30. The method of claim 29, wherein said electronic device is a camera.

31. The method of claim 29, further comprising emitting said light via a photoemitter coupled to said contact lens.

32. A method for controlling electronic devices, comprising:

receiving light via a photodetector coupled to a contact lens;

detecting a blink of an eye of a user wearing said contact lens based on said light; and automatically controlling an electronic device based on said detecting.

33. The method of claim 32, wherein said electronic device is a camera.

34. The method of claim 32, further comprising emitting said light via a photoemitter coupled to said contact lens.

* * * * *

UNITED STATES PATENT AND TRADEMARK OFFICE
CERTIFICATE OF CORRECTION

PATENT NO. : 6,885,818 B2
APPLICATION NO. : 09/918211
DATED : April 26, 2005
INVENTOR(S) : Tim Goldstein It is certified that error appears in the above-identified patent and that said Letters Patent is hereby corrected as shown below:

On the face page, in field (56), under "U.S. Patent Documents", in column 1, line 2, below "3,958,560 A *   5/1976   March.....................600/319"
insert -- 4,089,329     5/1978     Couvillon, et al. --.

On the face page, in field (56), under "U.S. Patent Documents", in column 2, line 3, below "5,956,122 A     9/1999     Doster...............351/210"
insert -- 6,120,460     9/2000     Marcio Marc Abreu --.

On the face page, in field (56), under "U.S. Patent Documents", in column 2, line 6, below "6,549,231 B1     4/2003     Matsui"
insert -- 6,558,050 B1 *     5/2003     Ishibashi     396/429x --.

On the face page, in field (56), under "Foreign Patent Documents", in column 2, line 1, below "JP     2001036800     2/2001"
insert -- FR     2775588 A          9/1999     Andres Jacques Patri
            GB     1 581 018         12/1980    Keith Hobbs
            GB     2 075 671 A       11/1981    Tamkin, et al.
            WO     99/01063          1/1999     Schnakenberg, et al. --.

On the face page, in field (56), under "Other Publications", in column 2, line 4, below "for Controlling Electronic Devices," filed Sep. 4, 2003."
insert -- Search Report. U.K. Patent Office. Application No. GB     0216119.8. January 31, 2003. --.

In column 11, line 41, in Claim 13, delete "eyclid" and insert -- eyelid --, therefor.

In column 11, line 52, in Claim 14, delete "step" before ", within".

UNITED STATES PATENT AND TRADEMARK OFFICE
CERTIFICATE OF CORRECTION

PATENT NO. : 6,885,818 B2
APPLICATION NO. : 09/918211
DATED : April 26, 2005
INVENTOR(S) : Tim Goldstein It is certified that error appears in the above-identified patent and that said Letters Patent is hereby corrected as shown below:

In column 12, line 22, in Claim 19, delete "responses" and insert -- response --, therefor.

Signed and Sealed this

Twenty-ninth Day of December, 2009

David J. Kappos
*Director of the United States Patent and Trademark Office*